United States Patent
Yoon et al.

(10) Patent No.: US 9,988,560 B2
(45) Date of Patent: Jun. 5, 2018

(54) ANTISTATIC SILICONE RELEASE COATING FILMS

(75) Inventors: Jong-Uk Yoon, Gyeongsangbuk-do (KR); Jeong-Woo Lee, Gyeongsangbuk-do (KR); Moon-Bok Lee, Gyeongsangbuk-do (KR); Ki-Bong Suh, Gyeongsangbuk-do (KR); Sang-Pil Kim, Gyeongsangbuk-do (KR)

(73) Assignee: TORAY ADVANCED MATERIALS KOREA INC., Gyeongsangbuk-Do (KR)

( * ) Notice: Subject to any disclaimer, the term of this patent is extended or adjusted under 35 U.S.C. 154(b) by 910 days.

(21) Appl. No.: 12/297,042

(22) PCT Filed: Sep. 5, 2007

(86) PCT No.: PCT/KR2007/004288
§ 371 (c)(1),
(2), (4) Date: Oct. 13, 2008

(87) PCT Pub. No.: WO2008/114916
PCT Pub. Date: Sep. 25, 2008

(65) Prior Publication Data
US 2009/0197100 A1 Aug. 6, 2009

(30) Foreign Application Priority Data
Mar. 16, 2007 (KR) .................... 10-2007-0025905

(51) Int. Cl.
*B32B 27/00* (2006.01)

(52) U.S. Cl.
CPC ........... *C09J 7/40* (2018.01); *C09J 2467/006* (2013.01); *C09J 2483/005* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 4,764,565 A | | 8/1988 | Iwasa et al. ............... 525/352 |
| 4,764,576 A | | 8/1988 | Ogawa et al. ............. 524/265 |
| 4,772,515 A | * | 9/1988 | Hara et al. ................. 428/447 |
| 5,064,891 A | * | 11/1991 | Fujiki et al. ............... 524/264 |
| 5,104,927 A | * | 4/1992 | Hara et al. ................. 524/731 |
| 5,300,575 A | * | 4/1994 | Jonas et al. ................ 525/186 |
| 5,354,613 A | * | 10/1994 | Quintens et al. .......... 428/341 |
| 5,527,578 A | * | 6/1996 | Mazurek et al. .......... 428/41.8 |
| 6,057,041 A | * | 5/2000 | Sumi et al. ................ 428/447 |
| 6,299,799 B1 | * | 10/2001 | Craig et al. ................ 252/500 |
| 6,737,119 B1 | * | 5/2004 | Kim et al. .................. 427/387 |
| 2006/0210768 A1 | * | 9/2006 | Masuda ...................... 428/141 |
| 2007/0004899 A1 | * | 1/2007 | Hsu et al. ................... 528/377 |
| 2011/0210295 A1 | * | 9/2011 | Honda et al. ............. 252/519.2 |

FOREIGN PATENT DOCUMENTS

| | | | | |
|---|---|---|---|---|
| JP | S63-056561 | | 10/1988 | ............ C08L 83/07 |
| JP | H09-208826 | | 8/1997 | ............ C08L 83/07 |
| JP | 2002046393 A | * | 2/2002 | |
| JP | 2002-241613 | | 8/2002 | ............ C08L 83/04 |
| JP | 2003-251756 | | 9/2003 | ............ B32B 27/00 |
| JP | 2003-292874 | | 10/2003 | ......... C09D 133/02 |
| JP | 2004-151696 | | 5/2004 | |
| JP | 2006-348260 | | 12/2006 | ............ C08L 83/04 |
| KR | 1994-0010221 | | 10/1994 | ............ C08L 83/07 |
| KR | 20010080852 | * | 2/2001 | |
| KR | 10-2001-0049457 | | 6/2001 | ............ B32B 27/36 |
| KR | 10-2001-0055364 | | 7/2001 | ............ C08L 83/04 |
| KR | 10-2005-0034776 | | 4/2005 | .............. C08J 7/04 |
| KR | 10-2006-0096665 | | 9/2006 | |
| WO | WO 2004/088364 | | 10/2004 | |

OTHER PUBLICATIONS

JP 2002046393 A, Miyagi, Kiyoshi, Machine Translation (Feb. 2002).*
JP 63068687 A English Translation of Abstract (Mar. 1988).*
JP 2003-251756 English Machine Translation (2003).*
English machine translation of KR20010080852 (2001).*
Japanese Office Action dated Jun. 14, 2011 for JP Patent Application No. JP2009-506427, with English translation.

* cited by examiner

*Primary Examiner* — Kenneth J Stachel
(74) *Attorney, Agent, or Firm* — Harness, Dickey & Pierce, P.L.C.

(57) ABSTRACT

The invention relates to an antistatic silicone release film having a layer coated with an antistatic silicone release composition, and, used for semiconductors, electronics and display devices while addressing problems of static electricity generated when a general release film is separated from adhesive or an adhesive layer, and of contamination by such static electricity that causes critical product defects. The invention also relates to an antistatic silicon release film that can reduce product contamination caused by static electricity in peeling the film from adhesive or an adhesive layer, and achieves close adhesion between a substrate and a coated layer because of no interruption in curing a release layer, and also thereby has a stable release property.

7 Claims, No Drawings

ANTISTATIC SILICONE RELEASE COATING FILMS

CROSS-REFERENCE TO RELATED APPLICATION

This is a national application of International Serial No. PCT/KR2007/004288, filed Sep. 5, 2007 which claims priority of Korean Patent Application No. 10-2007-0025905, filed Mar. 16, 2007. The entire disclosures of the applications identified in this paragraph are incorporated herein by reference in their entireties.

TECHNICAL FIELD

The invention relates to an antistatic silicone release film having a layer coated with an antistatic silicone release composition, and, in particular, to an antistatic silicone release film having a layer coated with an antistatic silicone release composition and used for semiconductors, electronics and display devices while addressing problems of static electricity generated when a general release film is separated from adhesive and an adhesive layer, and of contamination by such static electricity that directly causes critical product defects. The invention also relates to an antistatic silicon release film that can reduce product contamination by static electricity in peeling the film from adhesive or an adhesive layer, has good adhesiveness between a substrate and a coated layer because of no interruption in curing a release layer, and also thereby has a stable release property.

BACKGROUND ART

Recently, the field of semiconductors, electronics and display devices are rapidly developing. In the field, synthetic resins or synthetic fibers are increasingly used, leading to a troublesome problem of static electricity to be settled. Generally, in the field of release films whose main purpose is to protect adhesive layers, more and more resins or fibers have been used and require antistatic performance for the use. Conventionally, adhesive layers have been made antistatic in order to settle the problem of contamination due to static electricity occurring when a release film is separated from an adhesive layer. However, if the adhesive layer is made antistatic, it does not fully exhibit antistatic performance since antistatic agents are not well compatible with adhesive. Therefore, release layers have been made antistatic, in addition to adhesive layers in many cases. Release property as a physical property required in a release film for the field of precision materials requires a proper peeling force depending on types and use of adhesive, high residual adhesiveness for not lowering adhesiveness by a release layer being transferred to an adhesive layer, solvent resistance that release layers are not peeled off by organic solvent of solvent type adhesive, high light transmission if release films are for optical use, etc.

Conventional antistatic technologies include internally adding anion compounds such as organic sulfonate and organic phosphate, depositing metallic compounds, coating with conductive inorganic particles, coating with low molecular anion or cation compounds, coating with conductive polymers, etc.

A known conventional method of producing antistatic release films with the aforementioned antistatic technologies is to contain metals, e.g., lithium, copper, magnesium, calcium, iron, cobalt or nickel, etc., in silicone compositions (see U.S. Pat. No. 4,764,565). The aforementioned method, however, is not cost effective and also has a limit in achieving antistatic performance: with the method, forming a uniformly coated layer for optical use is interrupted.

If the antistatic composition is of conductive polymers, ion-type polymers, etc., it interrupts curing of silicone release coating compositions, and it is hard to form a release coated layer. Close adhesion between an antistatic layer and a silicone layer is also deteriorated, so that silicone is transferred to adversely affect the function of adhesive. Therefore, in case of a conventional antistatic release film, both of the antistatic performance and the release property can be implemented by applying antistatic compositions on a substrate and drying the film and then applying release coating compositions, or by first applying antistatic compositions on one side of a substrate and then applying release compositions on the other side of the substrate. However, since such a method of forming a conventional antistatic release film requires a coating and drying process to be carried out at least twice, a lot of processing time and cost is needed.

DISCLOSURE OF INVENTION

Technical Problem

It is an idea of the invention to respond to such requirements and to address problems in prior art technologies. It is an object of the invention to provide a good silicone release film being made antistatic by reducing product contamination due to static electricity in peeling the film from adhesive, when the film according to the invention is used as a release film for semiconductors, electronics and display devices produced in an in-line or off-line production process.

It is another object of the invention to provide a very good antistatic silicone release film having a layer coated with an antistatic silicone release composition (hereinafter, 'antistatic silicone release film') being made sufficiently antistatic by applying a coating process only once, and of good adhesiveness between a substrate and a coated layer because there is no interruption in curing of release compositions.

The aforementioned and other objects and advantages of the invention will become apparent to those skilled in the art from reading the following description illustrating preferred embodiments of the invention.

Advantageous Effects

As described above, if the antistatic silicone release film according to the invention is produced through an in-line or off-line production process and is used as a release film for semiconductors, electronics and display devices, it is advantageous in that it is possible to reduce product contamination due to static electricity when peeling the film from adhesive layers thanks to a high level of antistatic performance.

The antistatic silicone release film according to the invention exhibits very good adhesiveness between a substrate and a coated layer because there does not occur interruption in curing a release layer, whereby the inventive film may be properly used for the aforementioned use thanks to stable release characteristics.

The aforementioned and other objects and advantages of the invention will become apparent to those skilled in the art from reading the following description illustrating preferred embodiments of the invention.

BEST MODE FOR CARRYING OUT THE INVENTION

An antistatic silicone release film according to the invention to achieve the aforementioned objects is characterized in that it comprises a polyester film and a layer coated with an antistatic silicone release composition at least once on at least one side of the polyester film, wherein the antistatic silicone release film satisfies both of the following equations 1 and 2:

$$SR \leq 12 \quad (1)$$

and $$SAS \geq 80 \quad (2)$$

where 'SR($\Omega$/sq)' is a surface resistance of the coated layer and 'SAS (%)' is a residual adhesiveness of the coated layer.

Preferably, the antistatic silicone release film according to the invention is characterized in that the antistatic silicone release composition comprises organo polysiloxane, organo hydrogen polysiloxane, silane coupling agent, conductive polymer resin and platinum chelate catalyst.

Preferably, the antistatic silicone release film according to the invention is characterized in that conductive polymer resin in the antistatic silicone release composition is produced by polymerizing polythiophene or derivatives thereof in polyanions.

Preferably, the antistatic silicone release film according to the invention is characterized in that the amount of the conductive polymer resin in the antistatic silicone release composition is 0.05 to 0.5 parts by weight based on 100 parts by weight of organo polysiloxane.

Preferably, the antistatic silicone release film according to the invention is characterized in that the amount of the silane coupling agent in the antistatic silicone release composition is 0.05 to 1 parts by weight based on 100 parts by weight of organo polysiloxane.

More preferably, the antistatic silicone release film according to the invention is characterized in that the antistatic silicone release composition comprises 1.2 to 5 parts by weight of a solid content.

More preferably, the antistatic silicone release film according to the invention is characterized in that the amount of organo hydrogen polysiloxane in the antistatic silicone release composition has 0.5 to 1.2 hydrogen atoms coupled to a silicone atom in the organo hydrogen polysiloxane for one vinyl group of the organo polysiloxane.

Hereinafter, the invention will be described in more detail with reference to the preferred embodiments of the invention.

It will be apparent to those skilled in the art that the embodiments are intended only to illustrate the invention in more detail, and the scope of the invention is not limited by those embodiments.

The polyester film used in the invention is not limited to a specific type, and a known conventional polyester film can be used as a substrate film for antistatic coating. In the invention, exemplary polyester films are of polyester resins, e.g., polyethylene terephthalate, polybutylene terephthalate, polyethylene naphthalate, etc. It should be noted that a substrate for the antistatic coating composition of the invention is not limited to a polyester sheet or film.

The polyester consisting of the film of the invention is obtained by polycondensing aromatic dicarboxylic acid and aliphatic glycol. Examples of the aromatic dicarboxylic acid include terephthalic acid, 2,6-naphthalene dicarboxylic acid, etc. Examples of the aliphatic glycol include ethylene glycol, diethylene glycole, 1,4-cyclohexane dimethanol, etc.

Examples of polyester include polyethylene terephthalate (PET), polyethylene-2,6-naphthalene dicarboxylate (PEN), etc. The exemplary polyester may be of copolymers containing a third component. Examples of the dicarboxylic acid component of the copolymer polyester include isophthalic acid, phthalic acid, terephthalic acid, 2,6-naphthalene dicarboxylic acid, adipic acid, sebacic acid, oxycarboxylic acid (e.g., P-oxybenzoic acid). Examples of the glycol component include ethylene glycol, diethylene glycol, propylene glycol, butanediol, 1,4-cyclohexane dimethanol, neopentyl glycol, etc.

Two or more types of the components of dicarboxylic acid and glycol may be mixed and used. For the film of the invention, uniaxial or biaxial orientation films are used for all of high transparency, productivity and workability. The conductive polymer resin contained in the antistatic silicone release composition of the invention is preferably polyanions mixed with polythiopene or derivatives thereof in order to obtain antistatic performance. In particular, the conductive polymer resin is obtained by using independently or mixing the compounds represented in the following chemical formula 1 and the chemical formula 2 and then polymerizing the resultant mixture under polyanions.

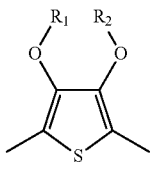

Chemistry Figure 1

In the above chemical formula 1, $R_1$ and $R_2$ represent hydrogen atoms, aliphatic hydrocarbon groups of C1 to 12, alicyclic hydrocarbon groups or aromatic hydrocarbon groups, respectively, and correspond particularly to methyl groups, ethyl groups, propyl groups, isopropyl groups, butyl groups, benzene groups, etc.

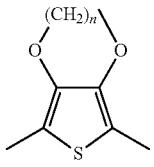

Chemistry Figure 2

Where n represents an integer of 1 to 4.

The poly anions are acidic polymer, also polymeric carboxylic acid or polymeric sulfonic acid, polyvinyl sulfonic acid, etc. Examples of polymeric carboxylic acid are polyacrylic acid, polymethacrylic acid, polymaleic acid, etc. An example of polymeric sulfonic acid is polystylene sulfonic acid, etc.

In the meantime, in the invention, polymer emulsion is used, which comprises 0.5 weight % of poly(3,4-ethylene dioxythiopene) and 0.8 weight % of polystylene sulfonic acid.

The amount of the conductive polymer resin is 0.05 to 0.5 parts by weight based on 100 parts by weight of organo polysiloxane in the composition for forming layers coated with antistatic silicone release composition of the invention.

If the amount thereof is less than 0.05 parts by weight, it is hard to make a film sufficiently antistatic. If the amount thereof is more than 0.5 parts by weight, platinum catalyst does not function and a problem is thus caused in the curing process.

An exemplary molecular structure of organo polysiloxane of the invention is shown in the following chemical formula 3:

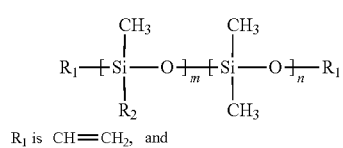

Chemistry Figure 3

$R_1$ is $CH=CH_2$, and $R_2$ is $CH_2$—$CH_2$—$CH_2$—$CH_2$—$CH=CH_2$, $CH_3$

Where m and n are an integer greater than zero (0).

The organo polysiloxane shown above contains a vinyl group in the molecule, where the vinyl group may be present in any part of the molecule, but preferably at the end of the molecule in particular. It may be of a normal or branch type molecular structure, or a combination thereof. Organo hydrogen polysiloxane used as a hardener in the coating composition according to the invention has an exemplary molecular structure shown in the following chemical formula 4:

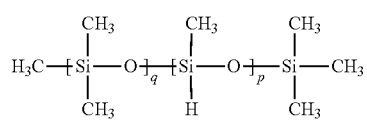

Chemistry Figure 4

Where q and p are an integer greater than zero (0).

The organo hydrogen polysiloxane has a normal, branch or ring type molecular structure, or a combination thereof. Viscosity or molecular weight thereof is not limited to a specific value, but it must be well compatible with the organo polysiloxane. For the amount of the organo hydrogen polysiloxane in the invention, it is preferable that 0.5 to 1.2 hydrogen atoms are coupled to a silicone atom, on the basis of one vinyl group of the organo polysiloxane. If the number of hydrogen atoms coupled to a silicone atom is less than 5, on the basis of one vinyl group of organo polysiloxane, the composition is not cured well. If the number of hydrogen atoms to be coupled thereto is more than 1.2, elasticity or physical properties may be deteriorated after a curing process. In the meantime, in the antistatic silicone release composition according to the invention, if the amount of organo-hydrogen polysiloxane is more than that of organo polysiloxane, too much crosslinking is facilitated to cause reduced flexibility thus to create cracks in the resulting film and result in reduced smoothness in the film.

The silane coupling agent in the antistatic silicone release composition according to the invention is an important component as a bridge between a substrate and a coated layer and for blocking functional groups acting as catalyst poison in the conductive polymer resin. Examples of the silane coupling agent in the invention include epoxy silane, amino silane, vinyl silane, methacryloxy silane, isocyanate silane coupling agents, etc.

The platinum chelate complex used as a catalyst in the antistatic silicone release composition according to the invention plays an important role in curing the coating composition. If the coating composition and a coating substrate contain nitrogen, phosphor, sulfur compounds or polymeric substances of ion type, the platinum chelate complex can't function as a catalyst, and the silicone release composition is not completely cured to lose release property or to result in lowered adhesiveness between an antistatic layer and a silicone layer, so that silicone is transferred. In the invention, the silane coupling agent is used to block the functional group in the antistatic silicone release composition in order to prevent interruption of curing. By coating with the mixture of an antistatic composition and a release composition only once, both of antistatic performance and release property is implemented.

The antistatic silicone release composition according to the invention is diluted to contain 1.2 to 5 weight % of a solid content based on the total weight of the coating composition and then coated on a polyester film. The solvent used in the coating composition is not limited to a specific type, provided that it can disperse the solids in the invention to be coated on a polyester film or antistatic polyester film, but is preferably water. If the amount of solid content in the antistatic silicone release composition is less than 1.2 weight %, it is hard to achieve a sufficient peeling force for adhesive and antistatic performance. If the amount thereof is more than 5 weight %, transparency of a resultant film is lowered and aging may be caused in curing the coating composition.

Hereinafter, with the embodiments and comparative examples of the invention, the invention will be described in more detail.

EMBODIMENT

Embodiment 1

First, a silicone release composition was produced which comprised 0.05 parts by weight of conductive polymer resin, 0.05 parts by weight of silane coupling agent, 5 parts by weight of organo hydrogen polysiloxane and 50 ppm of platinum chelate catalyst, based on 100 parts by weight of organo polysiloxane, by diluting the composition in water, the composition having 2 weight % of a total amount of solid content. The composition was then coated on a corona-discharge treated surface of a polyester film in a thickness of 10 microns. After coating the film with the composition, the film was dried with a hot air drier at 180° C. for 10 seconds to produce an antistatic silicone release film having a layer coated with an antistatic silicone release composition.

Embodiment 2

An antistatic silicone release film was produced in the same manner as in the above embodiment 1, except that 0.1 part by weight of conductive polymer resin was added to the composition.

Embodiment 3

An antistatic silicone release film was produced in the same manner as in the above embodiment 1, except that 0.5 parts by weight of conductive polymer resin and 0.5 parts by weight of silane coupling agent were added to the composition.

COMPARATIVE EXAMPLE

Comparative Example 1

An antistatic silicone release film was produced in the same manner as in the above embodiment 1, except that 1.0 parts by weight of conductive polymer resin was added to the composition.

Comparative Example 2

An antistatic silicone release film was produced in the same manner as in the above embodiment 1, except that 0.03 parts by weight of conductive polymer resin were added to the composition.

Comparative Example 3

An antistatic silicone release film was produced in the same manner as in the above embodiment 3, except that 0.5 parts by weight of acrylic antistatic agent were added to the composition without adding conductive polymer resin.

Comparative Example 4

An antistatic silicone release film was produced in the same manner as in the above embodiment 3, except that 0.5 parts by weight of class 4 ammonium antistatic agent were added to the composition without adding conductive polymer resin.

Physical properties for the films produced according to the above embodiments 1 to 3 and the comparative examples 1 to 4 were evaluated in the following manner and Table 1 shows the result.

EXPERIMENTAL EXAMPLE

Experimental Example 1: Measuring Surface Resistance

Film samples were placed in an environment at 23° C. and 50% RH of humidity to measure a surface resistance, pursuant to JIS K7194 with an antistatic electricity measuring instrument (MCP-T600, available from Mitsubishi Co.).

Experimental Example 2: Measuring Peeling Force

Samples were first prepared.
1) Silicone coated samples for measuring peeling force were placed in an environment at 25° C. and 65% RH for 24 hours.
2) A standard adhesive tape (TESA7475) was laminated on the silicone coated surface of the samples which were then pressed in an environment at a room temperature of 25° C. and at a high temperature of 50° C. with a load of 20 g/cm$^2$ for 24 hours to measure physical properties of the samples.
Measuring instrument: chem-instrument AR-1000
How to measure:
1) 180° of peeling angle and 12 in/min of peeling speed; and
2) Sample size of 500 mm×1500 mm, size for measuring peeling force of 250 mm×1500 mm.
Measurement data: Peeling force is indicated in g/in and measurement values were averaged after measuring peeling force of the samples five times, respectively.

Experimental Example 3: Measuring Residual Adhesiveness

Samples were first prepared.
1) The silicone coated samples were placed in an environment at 25° C. and 65% RH for 24 hours.
2) A standard adhesive tape (Nitto 31B) was laminated on the silicone coated surface of the samples which were then pressed at a room temperature with a load of 20 g/cm$^2$ for 24 hours.
3) The adhesive tape laminated on the silicone coated surface was then taken off without contamination and then attached on a smooth and clean PET film surface and pressed to laminate it by running a tape roller (ASTMD-1000-55T) of 2 kg to and fro once.
4) Measuring peeling force
Measuring instrument: chem-instrument AR-1000
How to measure:
1) 180° of peeling angle, 12 in/min of peeling speed.
2) Sample size of 500 mm×1500 mm, size of 250 mm×1500 mm for measuring peeling force.

$$\text{Residual adhesiveness (\%)} = \frac{\text{Peeling force of adhesive tape laminated to and then peeled from a coated surface}}{\text{Peeling force of adhesive tape not having been laminated on the coated surface}} \times 100$$

Experimental Example 4: Measuring Curing Level

For the experiment, 3 µl of the following test reagent was applied with a micro syringe to the samples in which a 3M 810 adhesive tape was laminated on a silicone coated layer and taken off to decide a curing level depending on a degree of reagent spreading on the basis of a standard sample of an adhesive tape which was not laminated on a silicone release coated layer.
Test reagent=IPA+Violet pigment
IPA=>melts the 3M 810 adhesive layer, but can't melt a silicone release coated layer. As compared to a standard sample, it is decided that a curing degree is worse as the test reagent spreads less. The result is represented as Very good, Good, Average or Poor depending on the relative size of spots.

Experimental Example 5: Measuring Solvent Resistance

The experiment was carried out to measure solvent resistance of the film surface of the samples.
For the measurement, after soaking a cotton stick in a specific organic solvent, the cotton stick ran to and fro on the silicone coated film surface ten times at a speed of 5 cm/sec with a load of 100 g while keeping the angle of the cotton stick at 45 degrees. The state of the coated surface was evaluated on the basis of following criteria.

Experimental Example 6: Measuring Rub-Off Property

The silicone release coated layer was rubbed strongly with a finger to check a degree of silicone removal on the polyester film to see adhesive characteristics between a cured silicone layer and a substrate.

TABLE 1

| Category | Surface resistance (Ω/sq) | Peeling force (g/in) | Residual adhesiveness (%) | Curing level | Solvent resistance | | | | Rub-off |
|---|---|---|---|---|---|---|---|---|---|
| | | | | | EA | IPA | MEK | TOL | |
| Embodiment 1 | $10^8$ | 15.7 | 96.3 | ◎ | ◎ | ◎ | ◎ | ○ | ○ | ◎ |
| Embodiment 2 | $10^6$ | 16.5 | 94.7 | ◎ | ◎ | ◎ | ◎ | ○ | ○ | ◎ |
| Embodiment 3 | $10^5$ | 17.1 | 93.5 | ○ | ◎ | ◎ | ◎ | ○ | ○ | ○ |
| Comparative example 1 | $10^5$ | 17.3 | 89.8 | X | X | X | X | X | X | X |
| Comparative example 2 | $10^{13}$ | 15.3 | 96.7 | ◎ | ◎ | ○ | ○ | ◎ | ◎ | ◎ |
| Comparative example 3 | $10^9$ | 16.6 | 87.3 | X | X | X | X | X | X | X |
| Comparative example 4 | $10^{10}$ | 16.9 | 88.4 | X | X | X | X | X | X | X |

(◎: Very good, ○: good, Δ: normal, X: poor)
(EA: Ethyl Acetate; IPA: Isopropyl Alcohol; MEK: Methyl Ethyl Ketone; and TOL: Toluene)

As seen in the above table 1, it is known that the embodiments 1 to 3 of the invention can implement both of very good antistatic performance and stable release property. However, in case of the comparative example 1 in which an excessive amount of conductive polymer resin was added, curing of the coating composition was poor. In case of the comparative example 2 in which the amount of conductive polymer resin was not enough, antistatic performance was not achieved. In case of the comparative examples 3 and 4 in which antistatic agent was used that interrupts curing of the silicone release composition as described above in the invention, a curing level of a silicone release coated layer and adhesiveness between a substrate and a layer coated with a silicone release composition was poor.

In this specification, only some examples of various embodiments carried out by the inventors are illustrated, but it should be noted that the technical scope of the invention is not limited thereto and may be of course modified and varied by those skilled in the art.

From the foregoing description, it will be observed that various modifications and changes can be made without departing from the true spirit and scope of the present invention. It should be understood that the foregoing description is intended to illustrate and not to limit the scope of the invention as defined by the accompanying claims. The invention resides in each and every novel characteristic feature and each and every combination of the features.

The use of the verb "to comprise" and its conjugations does not exclude the presence of elements other than those stated in the claim. The use of the article "a" or "an" preceding an element does not exclude the presence of a plurality of such elements.

The invention claimed is:

1. An antistatic silicone release film comprising: a polyester film and a coating layer formed with an antistatic silicone release composition on at least one side of the polyester film,
   wherein the antistatic silicone release composition consists of:
   organo polysiloxane having one or more vinyl groups,
   organo hydrogen polysiloxane, wherein the organo hydrogen polysiloxane has 0.5 to 1.2 hydrogen atoms coupled to a silicon atom in the organo hydrogen polysiloxane, based on one vinyl group of the organo polysiloxane,
   a platinum chelate catalyst,
   0.05 to 1 parts by weight of a silane coupling agent based on 100 parts by weight of the organo polysiloxane,
   0.05 to 0.5 parts by weight of conductive polymer resin based on 100 parts by weight of the organo polysiloxane, wherein the conductive polymer is prepared by polymerizing polythiophene derivative containing both Formula 1 and Formula 2 with polyanions,

Formula 1 wherein each of $R_1$ and $R_2$ is independently selected from —H, methyl, ethyl, propyl, isopropyl, and butyl, and

Formula 2 wherein n is 1, 2, 3 or 4.

2. The antistatic silicone release film of claim 1, wherein the organo polysiloxane has the structure of Formula 3:

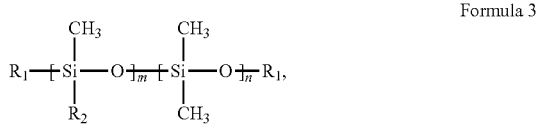

Formula 3 wherein $R_1$ is CH=$CH_2$; $R_2$ is $CH_2$—$CH_2$—$CH_2$—$CH_2$—CH=$CH_2$ or —$CH_3$; and m and n are integer greater than zero, and wherein the organo hydrogen polysiloxane has the structure of Formula 4:

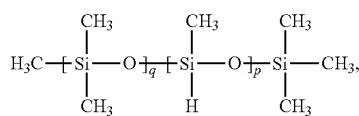

Formula 4 wherein p and q are integer greater than zero.

3. The antistatic silicone release film of claim 1, wherein the antistatic silicone release composition consists of 100 parts by weight of the organo polysiloxane, 5 parts by weight of the organo hydrogen polysiloxane, 0.05 parts by weight of the silane coupling agent, 50 ppm of the platinum chelate catalyst, and 0.05 parts by weight of the conductive polymer resin.

4. The antistatic silicone release film of claim 1, wherein the antistatic silicone release composition consists of 100 parts by weight of the organo polysiloxane, 5 parts by weight of the organo hydrogen polysiloxane, 0.05 parts by weight of the silane coupling agent, 50 ppm of the platinum chelate catalyst, and 0.1 parts by weight of the conductive polymer resin.

5. The antistatic silicone release film of claim 1, wherein the antistatic silicone release composition consists of 100 parts by weight of the organo polysiloxane, 5 parts by weight of the organo hydrogen polysiloxane, 0.5 parts by weight of the silane coupling agent, 50 ppm of the platinum chelate catalyst, and 0.5 parts by weight of the conductive polymer resin.

6. The antistatic silicone release film of claim 1, wherein the antistatic silicone release composition is diluted such that the coating layer contains 1.2 to 5 weight % of a solid content.

7. The antistatic silicone release film of claim 6, wherein the antistatic silicone release composition is diluted such that the coating layer contains about 2 weight % of a solid content.

* * * * *